US012524545B2

(12) United States Patent
Chowkwale et al.

(10) Patent No.: US 12,524,545 B2
(45) Date of Patent: Jan. 13, 2026

(54) DETECTION OF RANSOMWARE ATTACK AT OBJECT STORE

(71) Applicant: Seagate Technology LLC, Fremont, CA (US)

(72) Inventors: Bhakti Chowkwale, Freemont, CA (US); Paul Roger Heath, Severna Park, MD (US); Rupasree Roy, Fremont, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 82 days.

(21) Appl. No.: 18/649,892

(22) Filed: Apr. 29, 2024

(65) Prior Publication Data

US 2024/0362331 A1    Oct. 31, 2024

Related U.S. Application Data

(60) Provisional application No. 63/498,758, filed on Apr. 27, 2023.

(51) Int. Cl.
*G06F 21/56* (2013.01)
*G06N 5/04* (2023.01)
*G06N 20/00* (2019.01)

(52) U.S. Cl.
CPC ............ *G06F 21/566* (2013.01); *G06N 5/04* (2013.01); *G06N 20/00* (2019.01); *G06F 2221/034* (2013.01)

(58) Field of Classification Search
CPC .. G06F 21/566; G06F 2221/034; G06F 7/023; G06N 5/04; G06N 20/00; H04L 41/16; H04N 21/251; H04N 21/466; H04N 21/45; H04N 21/4662

See application file for complete search history.

(56) References Cited

U.S. PATENT DOCUMENTS

| | | | |
|---|---|---|---|
| 12,010,129 B2 * | 6/2024 | Vörös | H04L 63/20 |
| 12,086,274 B2 * | 9/2024 | Gadde | G06F 21/60 |
| 2013/0219370 A1 * | 8/2013 | Beale | G06F 11/3466 717/128 |
| 2019/0087572 A1 * | 3/2019 | Ellam | G06F 21/12 |
| 2019/0251279 A1 | 8/2019 | Emberson et al. | |
| 2019/0342311 A1 | 11/2019 | Muddu et al. | |
| 2020/0082272 A1 * | 3/2020 | Gu | G06N 3/045 |
| 2021/0044604 A1 | 2/2021 | Annen et al. | |
| 2021/0216627 A1 | 7/2021 | Grunwald et al. | |

(Continued)

*Primary Examiner* — Michael Won
(74) *Attorney, Agent, or Firm* — HOLZER PATEL DRENNAN

(57) ABSTRACT

The technology disclosed herein provides batchwise metric-based malware detection by receiving a plurality of input/output (IO) requests, generating IO trace sequences by combining a number of IO requests, generating batchwise metrics, each of the batchwise metrics corresponding to one of the IO trace sequences and generated based on an operation performed on values of parameters within IO trace sequences, generating inferential model input feature vectors based on the generated batchwise metrics, and training an inferential model based on a plurality of the generated inferential model input feature vectors and ground truth values corresponding to the IO trace sequences, each of the ground truth values indicating whether a corresponding one of the IO trace sequences represents a ransomware attack.

20 Claims, 7 Drawing Sheets

(56) References Cited

U.S. PATENT DOCUMENTS

| | | | |
|---|---|---|---|
| 2021/0216633 A1 | 7/2021 | Lee et al. | |
| 2021/0303687 A1 | 9/2021 | Pendlebury et al. | |
| 2023/0252149 A1* | 8/2023 | Jain | G06F 21/566 |
| | | | 713/168 |
| 2024/0005000 A1* | 1/2024 | Heath | G06F 21/565 |
| 2024/0086532 A1* | 3/2024 | Das | G06F 21/564 |
| 2024/0098106 A1* | 3/2024 | Allen | G06F 21/554 |
| 2024/0161203 A1* | 5/2024 | Falandino | G06Q 10/06311 |
| 2024/0161204 A1* | 5/2024 | Bien | G06Q 40/08 |
| 2024/0232889 A1* | 7/2024 | Skalski | G06N 3/045 |
| 2025/0209156 A1* | 6/2025 | Sankaran | G06N 3/045 |

\* cited by examiner

DETECTION OF RANSOMWARE ATTACK AT OBJECT STORE

CROSS-REFERENCE TO RELATED APPLICATIONS

The present application claims benefit of priority to U.S. Provisional Patent Application No. 63/498,758, entitled "Detection of Ransomware Attack at Object Store" and filed on Apr. 27, 2023, which is specifically incorporated by reference herein for all that it discloses or teaches.

BACKGROUND

Ransomware has become a major cyber-security threat over the past few years. It is estimated to have cost enterprises upwards of $5 billion in damages annually. A significant issue in failing to detect ransomware is the prevalent use by data security vendors of signature-based approaches to malware detection. While this approach may be effective for some malware detection, it is not as reliable for ransomware detection because it is easy for a bad actor to release a new variant of ransomware with a different signature and thereby escape detection. Some newer data security products have introduced machine learning-based behavioral analysis to combat this signature modification, but these approaches can be computationally expensive.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

The technology disclosed herein provides batchwise metric-based malware detection by receiving a plurality of input/output (IO) requests, generating IO trace sequences by combining a number of IO requests, generating batchwise metrics, each of the batchwise metrics corresponding to one of the IO trace sequences and generated based on an operation performed on values of parameters within IO trace sequences, generating inferential model input feature vectors based on the generated batchwise metrics, and training an inferential model based on a plurality of the generated inferential model input feature vectors and ground truth values corresponding to the IO trace sequences, each of the ground truth values indicating whether a corresponding one of the IO trace sequences represents a ransomware attack.

These and various other features and advantages will be apparent from a reading of the following Detailed Description.

BRIEF DESCRIPTION OF THE FIGURES

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
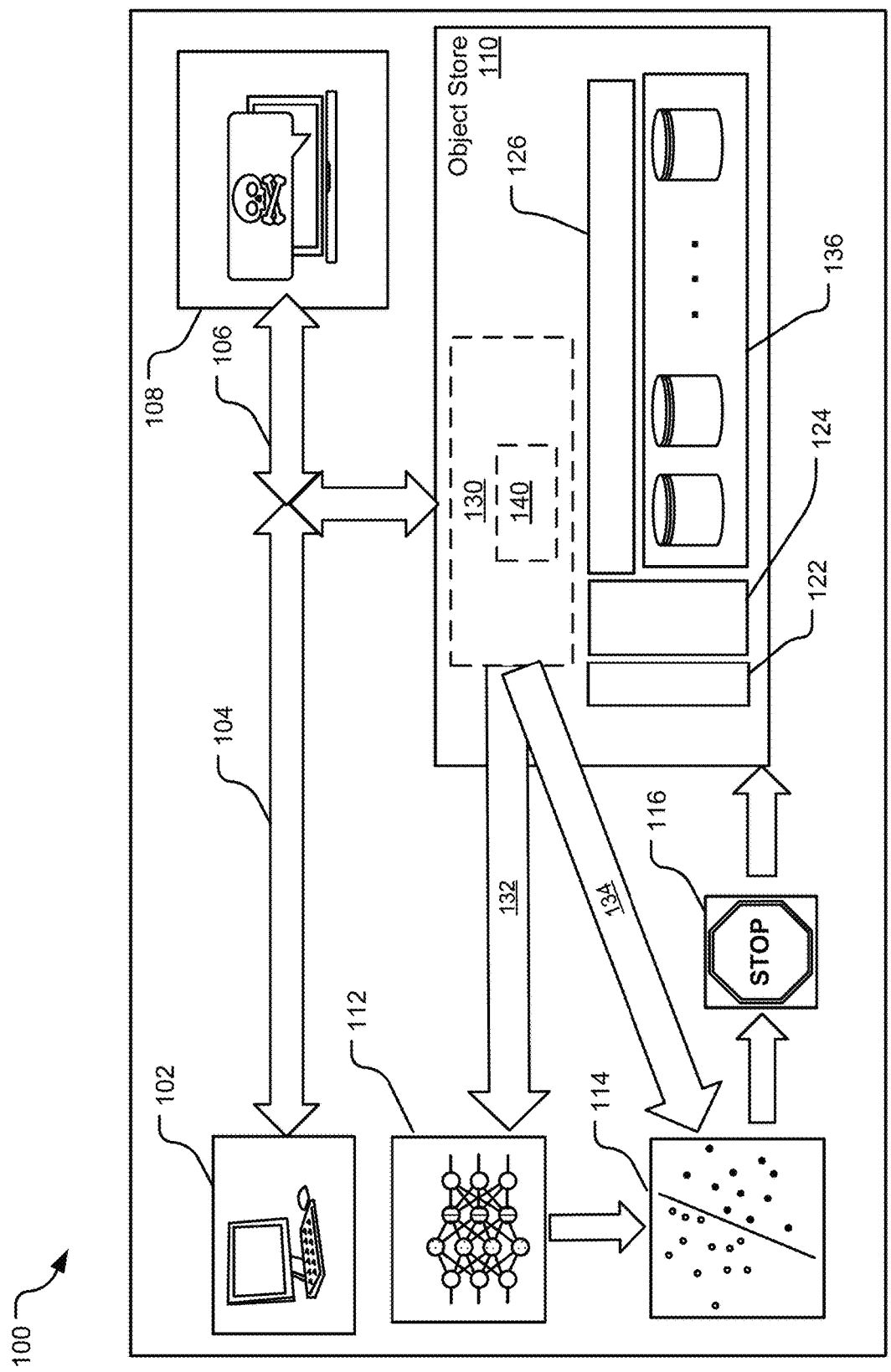
FIG. 1 illustrates an example schematic diagram of a system for detecting ransomware attacks on an object store.

Ransomware is an increasingly potent threat to modern computer systems. Like other forms of malware, a ransomware attack gains access to a computer system through one of many access vectors. Once on the machine, the ransomware executes after some trigger point. The code will enumerate items in the file system. Files that meet the requirements of the ransomware infection, typically user files rather than system files, are individually encrypted and written back to the filesystem, sometimes under a different name. At the end of the enumeration and encryption process, the ransomware may issue a notice to the user indicating that the files have been encrypted and can be released after a ransom is paid. Ransoms are normally paid in some form of cryptocurrency to provide a measure of anonymity to the attacker. Timely detection of such ransomware attacks is important to ensure that not a large number of files are encrypted and, therefore, subject to ransom.

The technology disclosed herein pertains to a method for the detection of ransomware-type malware attacks on an object store system. Most of the existing solutions for ransomware detection are client-side solutions in that they monitor activity at a client, such as unusual operating system activity, etc. The solutions disclosed herein address monitoring activity on the server side, specifically for servers configured to have an object store. Specifically, the implementations disclosed herein allow for determining the ransomware attacks quickly so that the ransomware is not able to infect a large amount of object files on the object store before its access to the server is blocked.

Specifically, the solution disclosed herein collects I/O traces from requests by clients to the object store. The client requests to an object store are specifically different in nature compared to client requests to files located on the server in that the client requests to an object store include a number of fields, such as a comm field identifying a process running on the server that requests the object store to do a specific operation, a process ID (PID) field that provides identification of the process, etc. Compared to this, client requests to a database or a server merely storing a number of files do not include any information about process ID, etc. Ransomware attacks may use the capabilities of the client requests to object stores, including their ability to initiate one or more processes to gain access to the object store data. The implementations disclosed herein use such fields specific to client requests to an object store to train a machine-learning model to detect ransomware attacks on object stores.

The IO trace records are formatted into short temporal sequences to help facilitate timely detection. The short temporal sequences are further processed to remove data that is unimportant (for example, the size of the data RW request, sector number of the data RW request, etc.). Subsequently, a first amount of the processed collection of such short temporal sequences is used to train a classification model (e.g., an ML model), and a second amount is used to test the classification model. In one or more implementations disclosed herein, the temporal sequences are generated based on a combination of IO requests. In an alternative implementation, the sequences are processed to remove extraneous data, such as by one hot coding of the byte size field, sector location field, or another field. Further, various implementations of the ransomware attack detection system disclosed herein may also be used in detecting malware attacks on object stores.

FIG. 1 illustrates a schematic diagram of a ransomware detection system 100 for detecting ransomware attacks on an object store. Specifically, the ransomware detection system 100 collects, stores, and analyzes access patterns to an object store 110. An example of an object store may be an AWS™ object store, a CORTX™ object store, a MinIO™ object store, etc. In one implementation, the ransomware detection system 100 collects samples of access patterns to the object store 110, generates temporal sequences of such access patterns, and reshapes the temporal sequence of access patterns. The object store 110 may include (one or more) object databases 136 storing data objects or other objects (referred to herein as data objects) that may be accessed by a data store access management module 126 such as the AWS simple storage service (S3) data store access management module, a POSIX based data store access management module, etc. The data objects stored in the object databases 136 may be managed by a management and monitoring module 124 that can use various interfaces 122, including application programming interfaces (APIs), graphical user interfaces (GUIs), command line interfaces (CLIs), etc.

One or more clients 102 may access the object store 110 to read, update, or write data objects from the object store 110 using data access channel 104. For example, the data access channel 104 may be implemented over a communication network such as the Internet. However, one or more malicious third party 108 may also use another data access channel 106, which also may be implemented on the Internet, to send malicious commands for malware and ransomware to the object store 110. The implementations disclosed herein provide a method of detecting such malware and ransomware attack commands to the object store 110.

An input/output (IO) request processor (e.g., an IO request processor 130) collects, stores, and analyzes access patterns to the object store 110. Specifically, the IO request processor 130 collects sequences of IO requests received at the object store 110 from the data access channel 104 and processes the sequences to generate a number of samples that may be used by a machine learning (ML) training module (e.g., an ML training module 112) that generates a classification model 114 that can be used to classify real-time IO requests to the object store 110 to determine if such IO requests include malware or ransomware attack commands. The IO requests received at the IO request processor 130 may include a number of fields such as a time of a request, a command, a PID, a disk identifier, a read/write (R/W) identifier, a sector, a number of bytes, latency, etc.

In one implementation, instead of processing each individual row of access requests individually in a list of requests, the IO request processor 130 processes a predetermined number (e.g., number of rows or entries) of access requests and processes them together in a sequence. For example, the IO request processor 130 may collect sequences of 64 or 128 rows of IO requests and process them together. These are merely examples of IO sequence sizes.

During a training phase, the IO request processor 130 may collect a sequence of IO requests to the object store 110 and remove one or more fields from the sequence of IO requests to generate condensed IO trace requests. For example, the IO request processor 130 may remove any row or request where the value of a sector is "0," as such requests may represent a system-level command that may not be part of any ransomware attack.

Similarly, the IO request processor 130 may remove the field representing the latency of an IO request, which provides how long it may take to process a particular IO request, as this field may not provide valuable information in determining whether a given IO request may or may not represent malware or ransomware attack. For example, the object store can determine to process elements out of order and cause latency that has nothing to do with the IO requests. On the other hand, the process name and/or the process ID for each IO request may be included in a flat file or other data object representing a filtered version of the batched IO request sequence, as the process name and/or the process ID provide valuable information about whether a given IO request may or may not represent a malware or ransomware attack. Other fields that are used by the IO request processor 130 may include the sector field, the byte field, the field representing whether a request is a read or a write request, and/or the field representing the name of the disk or storage device accessed by the IO request. Any of these fields may be used, in isolation or combination, as input features for training a classification model.

After removing the fields that are not of interest, the IO request processor 130 combines a predetermined number of condensed IO trace requests to generate a number of IO trace sequences (e.g., IO trace temporal sequences). The IO trace sequences may organize and represent the IO requests chronologically (e.g., temporally) based on when the requests are made, transmitted, and/or received. In an implementation, 64 condensed IO trace requests are combined to generate an IO trace sequence. Alternatively, 128 condensed IO trace requests may be combined to generate an IO trace sequence. The number of condensed IO trace requests used to generate an IO trace sequence may depend on the speed required to detect ransomware attacks. Thus, the larger the number of IO trace requests used to generate an IO trace sequence, the longer it may take to determine a ransomware attack. However, using a larger number of IO trace requests used to generate an IO trace sequence may also result in improved accuracy with which ransomware attacks may be determined.

Sometimes, IO requests can be better identified as malware by assessing batchwise metrics of raw data in the fields of the sequences of IO requests in addition to the raw data. In an implementation, the IO request processor 130 may include a batch analyzer 140 to perform a batchwise IO analysis of each IO trace sequence of IO requests batched by the IO request processor 130 to generate batchwise metrics. The batch analyzer 140 can provide representative batchwise metrics for the entire sequence based on analysis of data provided in the IO sequences (e.g., in the fields of the IO trace sequence). In implementations, the feature vectors generated include data (e.g., encoded or otherwise) from one or both of the IO trace sequence and/or the batchwise metrics in feature vectors for training the ML model. In implementations in which the feature vectors do not include data from the IO trace sequence, the generation of the IO trace sequence may be omitted. Examples of batchwise metrics include, without limitation, a batch of data per request, a batch read count, a batch write count, a batch read data size, a batch write data size, a batch read/write size comparison metric, and/or a batch location metric. In implementations, the batch analyzer 140 uses raw IO request data (as received at the IO request processor from the host system), uses condensed IO sequences, or uses a generated IO trace sequence as the source data to generate the batchwise metrics.

The batch of data per request is a statistically derived metric representing the amount of data upon which the requests in the IO trace sequence operate. Examples of statistical analyses the batch analyzer 140 may use to determine the statistical amount of data per request include an average of the data to be operated on per request (e.g., sum the size of all data to be operated on by IO requests in the IO trace sequence and divide by the number of IO requests in the IO trace sequence) or a median amount of data to be operated on among the IO requests (find the middle value of the size of data in the requests in the IO trace sequence). The amount of data per request may be found in a "bytes" or a "size" field of an IO request. Because ransomware attacks often involve large reads and writes of files to encrypt the files, the statistical amount of data per request may be indicative of a malware attack.

The batch read data size is a statistically derived metric representing the size of data upon which the read requests in the IO trace sequence operate. The batch read data size may be determined similarly (e.g., an average or a median) to data per request, except that the batch read data size separately accounts for the size of the data to be read in the IO requests in the IO trace sequence that are for reads. The batch write data size is a statistically derived metric representing the amount of data upon which the write requests in the b IO trace sequence operate. The batch write data size may be determined similarly (e.g., an average or a median) to the read data size, except that the batch write size is only for the size of data writes in the IO requests in the IO trace sequence that are for writes.

In one implementation, for each data sample the statistical feature derived from the data sample may include one or more of the columns disclosed below in table 1.

TABLE 1

Data averages: The average amount of data
Read Counts: The number of times data is read.
Read Data Average: The average amount of data that is read.
Write Counts: The number of time data is written.
Write Data Average: The average amount of data that is written.
Read, Write Data Equality: If the amount data read is equal to amount of data written. One if it is true, zero if it is false.
Sector Mean: The average of sector values where data is written or read Specifically, the sequential features are temporal sequences of the data. The length of the temporal sequences may depend on the data sample size. These features, both statistical and sequential may be concatenated to a single data frame. Subsequently, this data frame is used to train and test the machine learning models. The trained machine learning model can be used detect the presence of ransomware at data object stores.

The batch read count is a count of the read operations in the IO trace sequence. The batch write count is a count of the write operations in the IO trace sequence. When read and write counts are close or equal it can be indicative that data is being read, encrypted, and rewritten, as may be common in ransomware attacks.

The batch read/write comparison metric is a metric that represents the relative amount of data read and written in an IO trace sequence. In an implementation, the batch read/write comparison metric is a ratio of the total amount of data written relative to the total amount of data read in the IO trace sequence (e.g., a read/write data size ratio). In another implementation, the batch read/write comparison metric includes a read/write parity metric representing whether the read/write data size ratio is one (e.g., the size of data read is the same as the size of data written) or is within a predefined threshold difference from one (e.g., the size of data read is substantially the same as the size of data written) and outputs a representative value if the read/write data size ratio is one or is substantially close to one, as described (e.g., outputs a one for yes or a zero for no).

The batch location metric is a statistically derived metric representing a localization within memory of the data to be read or written in an IO trace sequence. In an implementation, the batch analyzer 140 can determine the batch location metric by determining a statistical representation of the sector ID numbers (e.g., in a logical block addressing, physical memory addressing, or another addressing system in the object store 110) of the data to be operated upon in the IO requests of the IO trace sequence. For example, the batch analyzer 140 may determine an average or median value of the sector ID values in the IO requests in the IO trace sequence. The batch location metric may additionally (e.g., as two separate metrics) or alternatively include a metric representing the variance or a metric derivative therefrom (e.g., standard deviation) of the sector ID values. Sector values may be sequential, or the logical addresses may be localized relative to physical addresses of memory to which the logical addresses correspond, and data controlled by a victim of a ransomware attack may be clustered within memory devices. Accordingly, the use of a batch location metric may help identify the locus of attack and/or the identity of a client being attacked with a ransomware or other malware attack.

Subsequently, the IO trace sequences and/or the batchwise metrics are used to generate feature vectors that may be used by the ML training module 112. Specifically, one or more fields of the IO trace requests and/or one or more of the batchwise metrics are transformed to generate the feature vector. For example, a process ID (PID) field, which is a numeric field, may be transformed into a non-numeric field that reduces the importance of the magnitude of the numeric number representing the PID. Specifically, the PID field has a numeric value, but the magnitudes of these values have no significance to what the value represents. For example, a process ID value of 1058 is no more or less important to classification than a process ID value of 2412. Therefore, in an implementation disclosed herein, the value of the PID is changed using one hot encoding process to be a value between −1 and +1.

Similarly, the value representing the disk field may be transformed by one-hot encoding to generate a modified disk field value. Furthermore, the value of the sector field, which may typically be a series of numeric values, may be scaled to be within a predetermined range. In one example, the value of the sector field is scaled so that each value falls within the range of −1 to +1. Similar scaling to a range between −1 and +1 may also be applied to the bytes field. Such scaling of the fields can help to ensure that the sector fields are not evaluated more heavily while training the classification model 114 compared to, for example, the bytes field. Specifically, even when the sector field is a large number, and the bytes field is a smaller number, scaling both of the sector field and the bytes field to a range of −1 to +1 ensures that the values of each are given equal importance during the training of the classification model 114.

Other parameters that may be similarly encoded, scaled, and/or standardized include batch of data per request, batch read count, batch write count, batch read data size, batch write data size, or a batch read/write size comparison metric, and/or a batch location metric.

Subsequently, each IO trace sequence may be assigned a ground truth value of 1 or 0 as a label (e.g., with 1 being the IO trace sequence representing a ransomware attack and 0 being the IO trace sequence not being a ransomware attack). The encoded fields of the IO trace sequence and/or the encoded batchwise metrics for the IO trace sequence may be combined to generate an ML model input feature vector for which the label represents the ground truth for the training phase. In implementations, the ground truth labels may be encoded in a ground truth vector specific for ground truths. The ground truth vector may be a one-dimensional vector with the same number of fields as there are requests in the IO trace sequence.

During the training phase, the ML model input feature vector generated based on the training set of IO requests and/or batchwise metrics is communicated in a communication 132 to the ML training module 112. The ML model input feature vectors generated by the transformation of the IO trace requests and/or batchwise metrics are used by the ML training module 112 to generate the classification model 114 that can be used to classify real-time IO requests to the object store 110 to determine if such IO requests include malware or ransomware attack commands. The training can include inputting the input feature vectors into the classification model 114, comparing the output with corresponding elements of the ground truth vector, determining a loss (e.g., a difference between them), and backpropagating the loss through the weights and/or constants of the classification model 114 until the classification model 114 provides accurate output within a predefined threshold. This is an example of supervised learning training. The ML training module 112 may use other inferential model training methods, including methods specified in this specification. Examples of an inferential model include an ML model, a multilayer perceptron classifier (MLPC) model, a logistic regression model, a decision tree model, a K-Nearest Neighbor model, and other inferential models specified herein. Other inferential models are contemplated, some of which are specified in this specification. Generating the ML model input feature vector in the manner recited herein allows for achieving over ninety-two percent (92%) overall combined accuracy for the above models.

During the application of the classification model 114, the IO request processor 130 processes sequences of real-time IO requests to the object store 110 and removes one or more fields from the sequence of IO requests to generate condensed IO trace requests. Subsequently, the IO request processor 130 combines a predetermined number of condensed IO trace requests to generate a number of IO trace sequences and then generates feature vectors based on the IO trace sequences. Alternatively or additionally, in implementations, the batch analyzer 140 of the IO request processor 130 combines a predetermined number of IO trace requests, combines a predetermined number of condensed IO trace requests, or uses a previously generated IO trace sequence to generate batchwise metrics and then generates feature vectors based on the batchwise metrics. It should be appreciated that the IO request processor may use one or both of the IO trace sequence or the batchwise metrics to generate and/or populate the feature vectors. These feature vectors based on the real-time IO requests are fed in a communication 134 to the classification model 114, which is able to classify the sequence of IO requests to the object store 110 as including ransomware or malware attack commands. If a sequence of IO requests is classified as including ransomware or malware attack commands, a process stopper 116 may prevent elements of the sequence of IO requests classified as including ransomware or malware attack commands from being executed by the object store 110.

Figure 2:
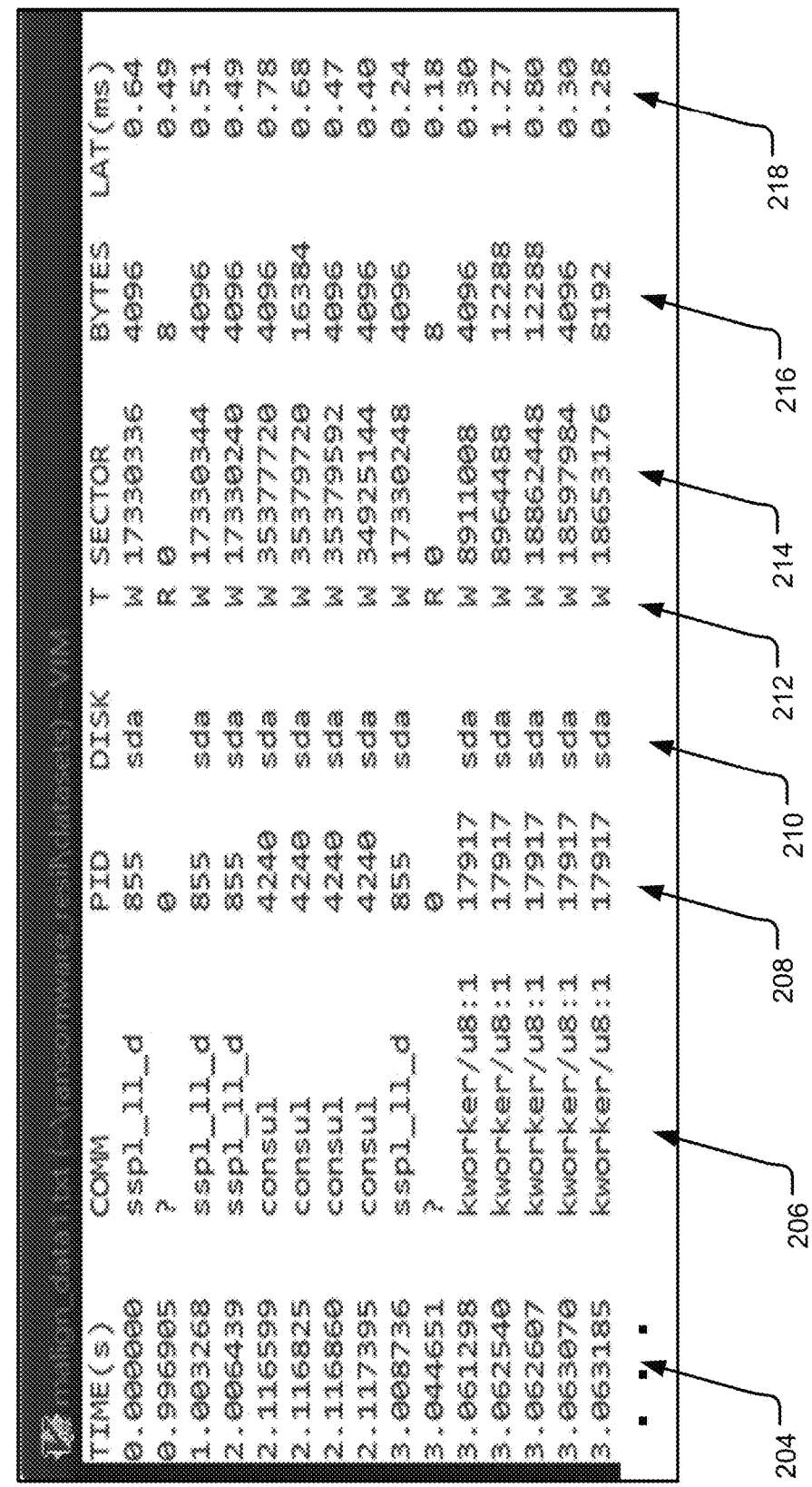
FIG. 2 illustrates an example schematic of a series of IO requests received at an object store.

FIG. 2 illustrates an example schematic of a series of IO requests received at an object store. Some of the processes may represent IO requests received at an object store. The processes 200 are different from client requests received at servers or databases that store data as files in that the processes 200 include information, including process names or process IDs, that may be used by ransomware to attack object stores. Therefore, the implementations disclosed herein use various fields of the processes 200 to train a classification model that can be used to detect ransomware or malware attacks on object stores.

Each of the columns of the processes 200 may represent various fields of an IO requests to the object store. For example, the time field 204 is the time stamp that represents the time when the IO request is received at the object store. The comm field 206 is the name of the process running on a server that requests the storage device to do the operation representing the row. The PID field 208 may represent the process ID of the particular process represented by the given row. The disk field 210 represents the disk ID that identifies the type of object store device that stores data affected by an IO request. The type (T) field 212 represents the type of operation (e.g., whether the operation of the given row is a read (R) or a write (W) operation).

Similarly, the sector field 214 represents a sector field that designates the sector on the storage device to which the request is directed. The bytes field 216 represents the size of data in the number of bytes to be accessed by the access request, whereas the last column represents the latency field 218 which gives the time it takes to complete the operation represented by a given row or IO request.

Figure 3:
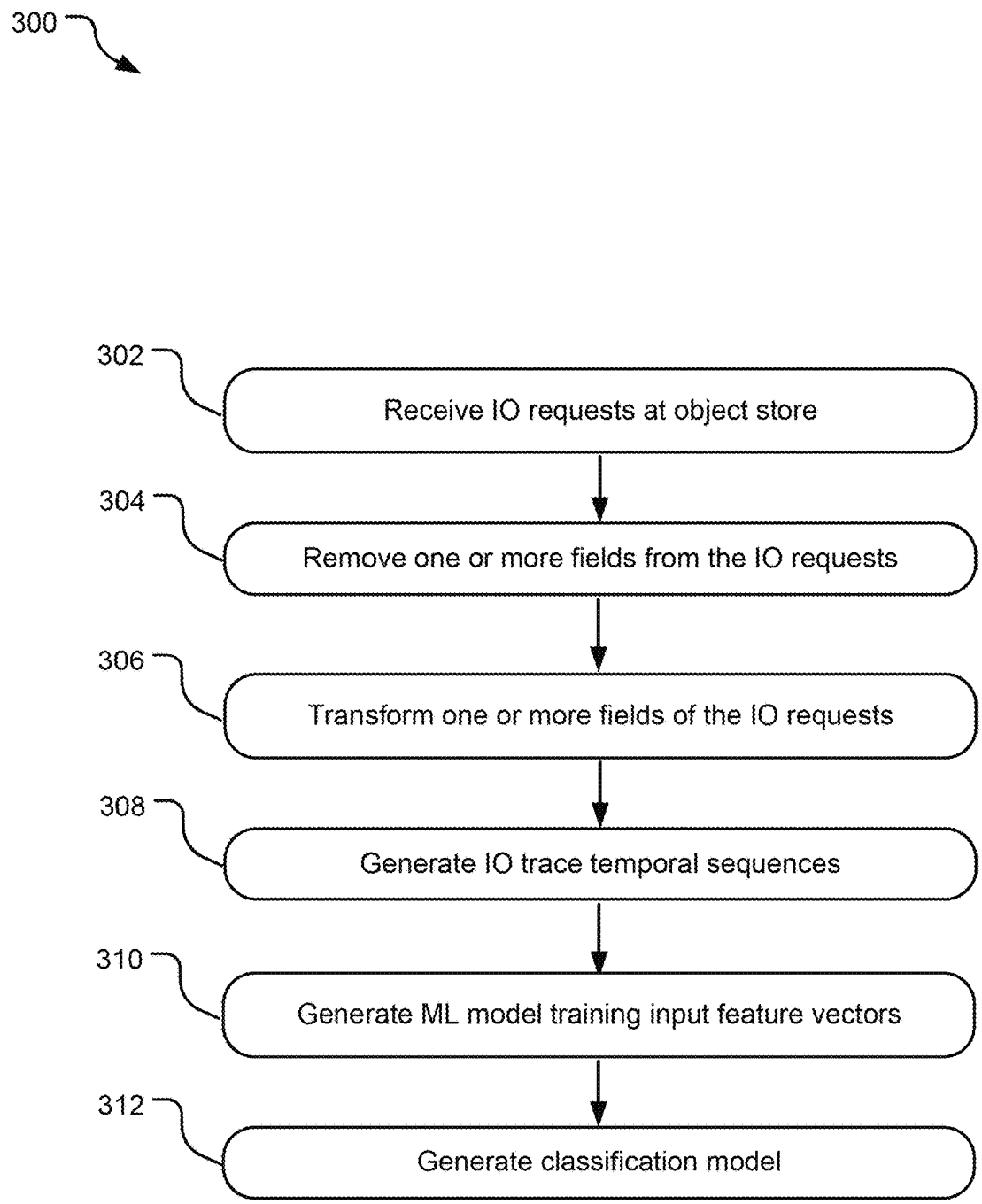
FIG. 3 illustrates example operations for training a machine learning (ML) model to detect ransomware attacks on an object store.

FIG. 3 illustrates example operations 300 for training a machine learning (ML) model to detect ransomware attacks on an object store. Specifically, the operations 300 are operations during a training phase of an ML model. An operation 302 receives IO requests at an object store. Specifically, the IO requests may include a collection of known malware or ransomware attack commands. An operation 304 removes one or more fields from the IO requests. The fields to be removed are determined to be fields that are not important in identifying an IO request as being a malware or ransomware. For example, the time field, which specifies what time the IO request is received at the object store, may be such a field that is removed.

An operation 306 transforms one or more fields of the IO request. For example, a scaling may be applied to the value of a sector field of the IO request so that each value falls within the range of −1 to +1. Similarly, the value of a bytes field also may be transformed to fall within a similar range. Subsequently, an operation 308 generates IO trace sequences from the condensed IO requests. For example, in one implementation, 64 or 128 condensed IO requests may be combined to generate an IO trace sequence. In one implementation, the operation 308 for generating IO temporal trace sequence may include generating a flat file form of the IO trace sequence. An operation 310 generates ML model training input feature vectors using the IO trace sequences. Specifically, the ML model input feature vector may include a number of IO trace sequence and ground truth of 0 or 1 for each IO trace sequence, with 1 indicating the IO trace sequence being a ransomware sequence and 0 indicating the IO trace sequence not being a ransomware sequence.

An operation 312 generates a classification model that can be used to classify real-time IO requests to the object store as containing malware or ransomware attack commands. The classification model may be generated using ML using one or more binary classification models. For example, in one implementation, the ML model may be one of a multilayer perceptron classifier (MLPC) model, a logistic regression model, a decision trees model, and a K-Nearest Neighbor model. Generating the ML model input feature vector in the manner recited herein allows for achieving over ninety-two percent (92%) overall combined accuracy for the above models.

Figure 4:
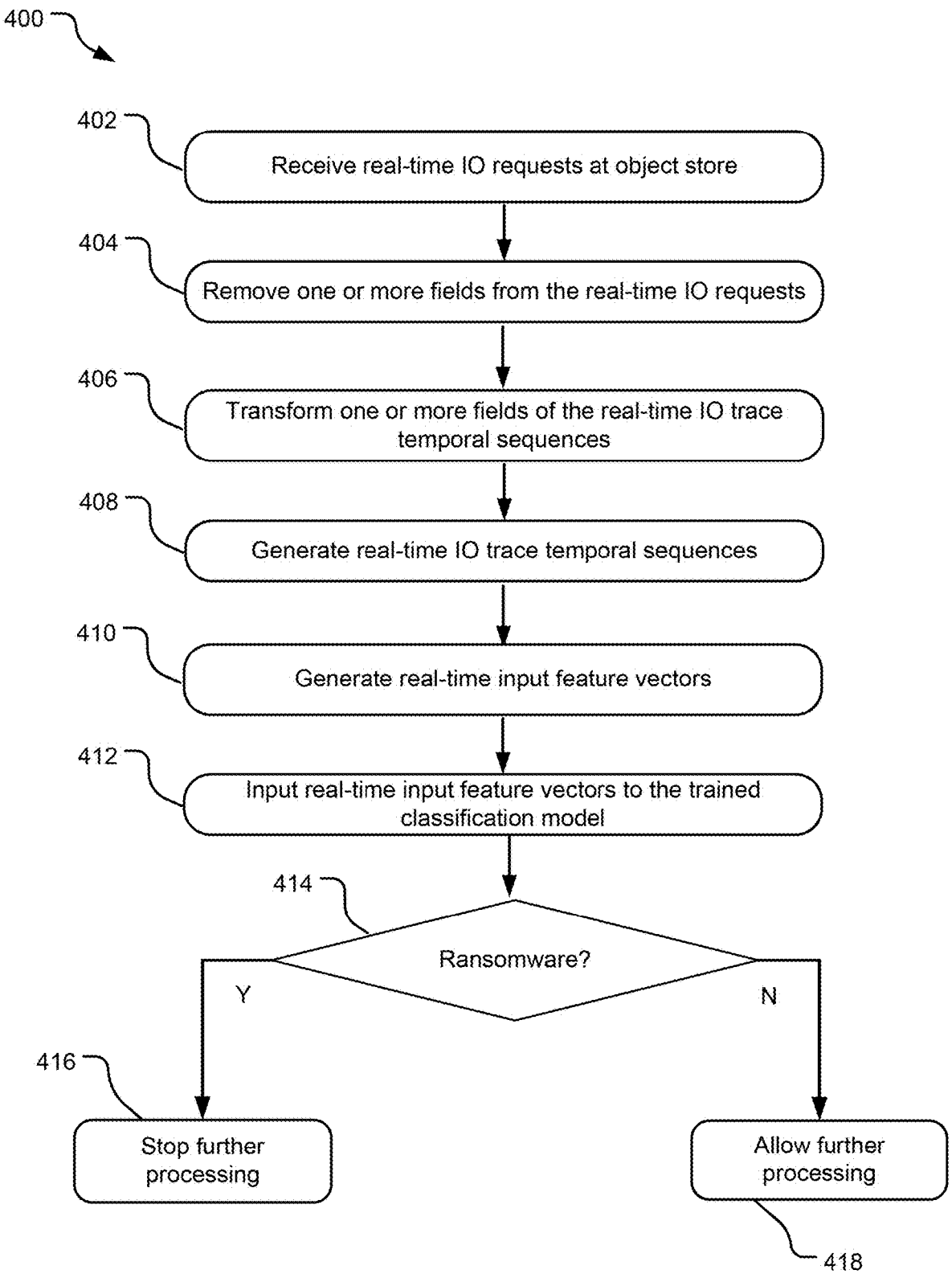
FIG. 4 illustrates example operations for detecting ransomware attacks on an object store using the trained ML model.

FIG. 4 illustrates example operations 400 for detecting ransomware attacks on an object store using the trained ML model. Specifically, the operations 400 are operations during an application phase where real-time IO requests to an object store are processed and classified using the trained ML model (e.g., at inference time) to determine if the real-time requests include malware or ransomware attack commands.

An operation 402 receives real-time IO requests at an object store. Examples of a number of such IO requests are disclosed in FIG. 2. An operation 404 removes one or more fields from the real-time IO requests. For example, the operation 404 may remove the time field providing the time when the IO request is received. An operation 406 transforms one or more fields of the real-time IO trace sequences. For example, a sector field may be transformed to that its value lies within a range of −1 to +1. Subsequently, an operation 408 generates real-time IO trace sequences. An operation 410 generates real-time input feature vectors based on the real-time IO trace sequences. An operation 412 inputs the real-time input feature vectors to the trained classification model.

An operation 414 determines if the classification model has classified the processed sequence of IO requests as containing malware or ransomware commands. If the sequence of IO requests is determined to be containing malware or ransomware commands, an operation 416 communicates a request to stop further processing the sequence of IO requests. If it is determined that the sequence of IO requests does not include any malware or ransomware commands, an operation 418 allows further processing of the sequence of IO requests.

Figure 5:
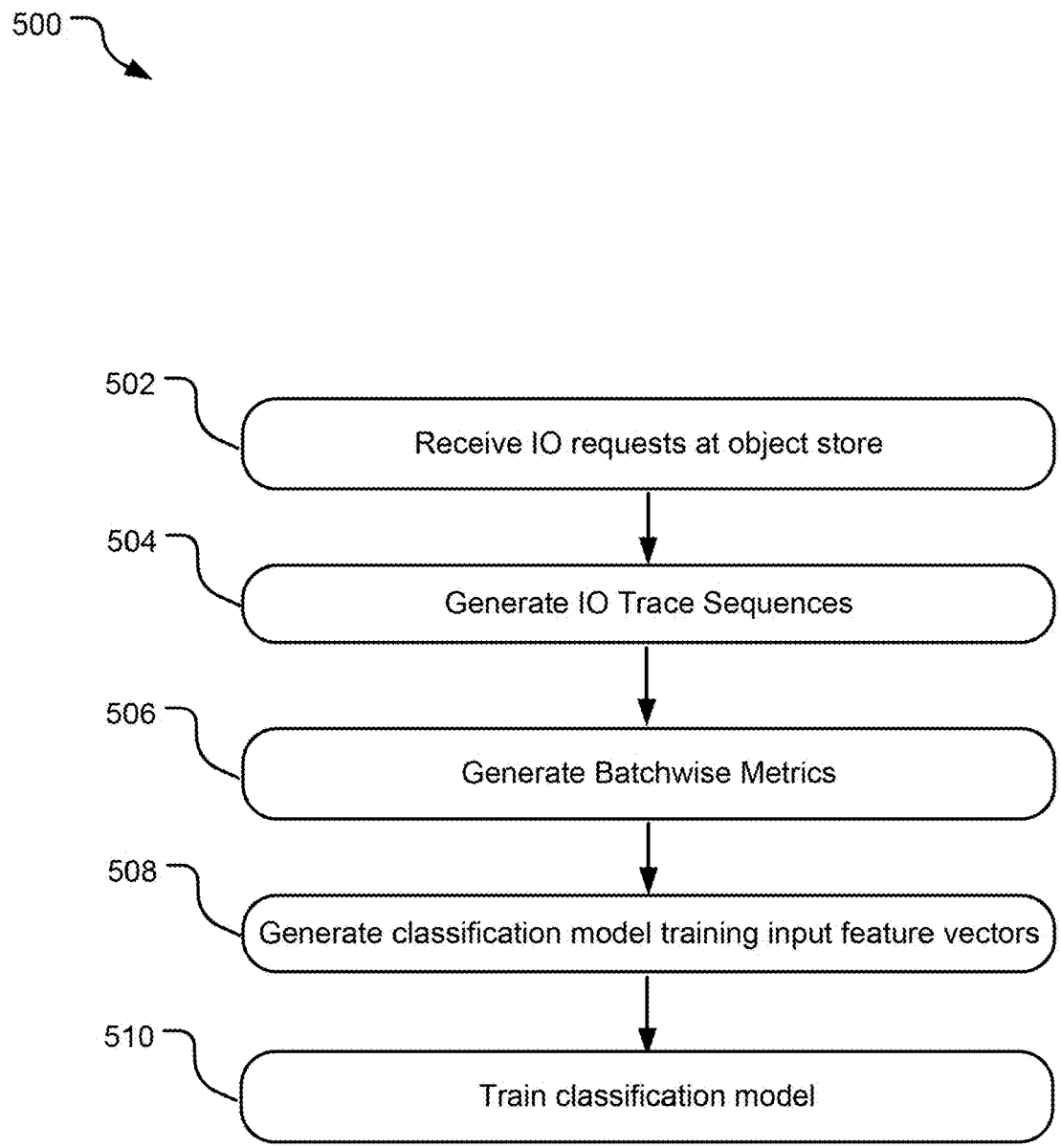
FIG. 5 illustrates example operations for training an inferential model to detect ransomware attacks on an object store based on batchwise metrics.

FIG. 5 illustrates example operations 500 for training an inferential model to detect ransomware attacks on an object store based on batchwise metrics. A receiving operation 502 receives a plurality of input/output (IO) requests at an object store. In an implementation, the implementations, the operations 500 are not conducted in a live object store but are conducted in an experimental environment with previously collected and labeled data operated upon in an object store different from the computing device(s) conducting the operations 500, so the receiving operation 502 may be omitted.

A generating operation 504 generates IO trace sequences by combining a predetermined number of the plurality of IO requests. The generating operation 504 may be conducted as described herein, for example, by operation 304, operation 306, and/or operation 308. Implementations are also contemplated in which the IO trace sequences are based on raw IO requests (e.g., to the exclusion of operations analogous to operation 304 and/or operation 306).

A generating operation 506 generates batchwise metrics. Each of the batchwise metrics may correspond to one of the IO trace sequences. Each of the batchwise metrics may be generated based on an operation performed on values of parameters within IO trace sequences corresponding to the batchwise metrics. These operations may include mathematical or statistical operations, such as determining an average, determining a median, determining a variance, and/or determining a standard deviation. The operations may be conducted on values of parameters represented in fields of the requests used to make the IO trace sequences. Examples of batchwise metrics include, without limitation, a batch of data per request, a batch read count, a batch write count, a batch read data size, a batch write data size, a batch read/write size comparison metric, and/or a batch location metric, as described herein.

A generating operation 508 generates inferential model input feature vectors based on the generated batchwise metrics. The batchwise metrics may be inserted as fields or vectorized features with or without the values of the features (e.g., values presented in fields of the requests) in the IO trace sequences. Each of the generated inferential model input feature vectors correspond to one of the IO trace sequences. The parameters of the feature vectors may be standardized, regularized, scaled, or otherwise encoded as described herein.

A training operation 510 trains an inferential model based on a plurality of the generated inferential model input feature vectors and ground truth values corresponding to the IO trace sequences. Each of the ground truth values may indicate whether a corresponding one of the IO trace sequences represents a ransomware attack. Comparing the output of the model resulting from input of a feature vector of a particular IO trace sequence and/or its corresponding batchwise metrics with a ground truth corresponding to the particular IO trace sequence can yield a loss which can be backpropagated throughout the inferential model. The loss can be determined for batches of the IO trace sequences and the collective loss can be backpropagated throughout the inferential model to train the inferential model. At some point, the inferential model should operate as a classification model that classifies IO trace sequences as representing or not representing malware to a predefined threshold degree of accuracy. These are merely examples of training methods for supervised learning, and other methods of training are specified herein.

Figure 6:
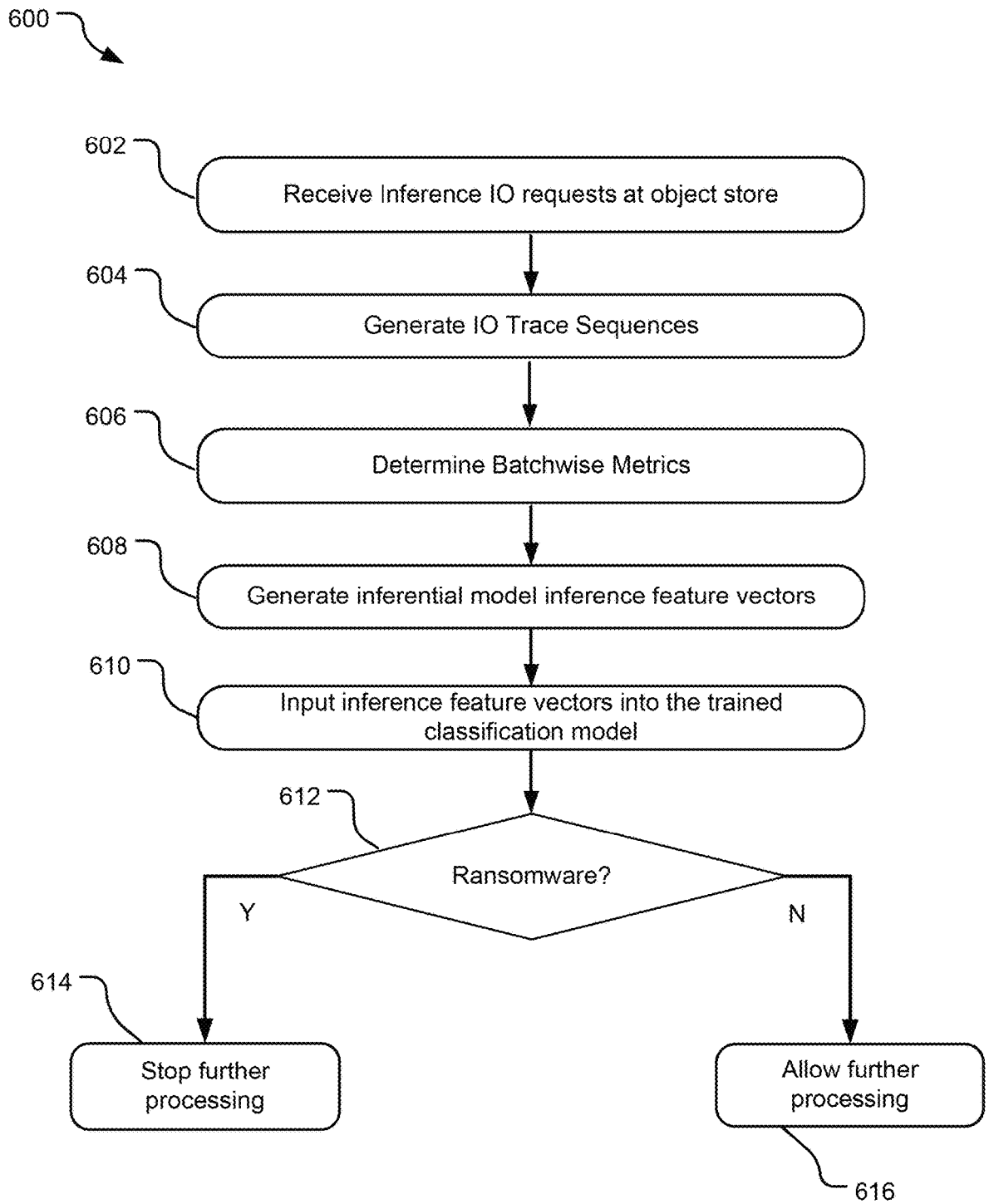
FIG. 6 illustrates example operations for detecting ransomware attacks on an object store using the trained inferential model based on the batchwise metrics.

FIG. 6 illustrates example operations 600 for detecting ransomware attacks on an object store using the trained inferential model based on batchwise metrics. A receiving operation 602 receives inference IO requests at an object store. The inference IO requests differ from training IO requests in that the inference IO requests are received in real-time at an object store using a trained classification model to attempt to identify and stifle ransomware or other malware attacks. Because the classification model is trained to classify the IO trace sequences and/or the batchwise metrics derived therefrom based on ground truth data with real attacks, the real-time determination of the attacks is quick, simply receiving input and generating output by a series of fast calculations (e.g., fast relative to time it takes to train the classification model).

A generating operation 604 generates inference IO trace sequences. The generating operation 604 may be conducted similarly to the generating operation 504 (e.g., using an implementation of operation 304, operation 306, and/or operation 308), but the generating operation 604 is based on inference IO requests rather than training IO requests.

A generating operation 606 generates batchwise metrics. The generating operation 606 may be conducted similarly to the generating operation 506 but for the inference IO trace sequences instead of training IO trace sequences.

A generating operation 608 generates inferential model inference feature vectors. The generating operation 608 may be conducted similarly to the generating operation 608 but uses the batchwise metrics based on the inference IO trace sequences.

An inputting operation 610 inputs inference feature vectors into the trained classification model. The trained classification model will classify whether each inference IO trace sequence includes requests representing a ransomware or other malware attack. This is illustrated in decision box 612. If the output of the trained classification model indicates that a particular IO trace sequence is indicative of a malware attack (Y), a stopping operation 614 stops or prevents processing of one or more of the requests in the particular IO trace sequence. If the output of the trained classification is not indicative of a malware attack (N), an allowing operation 616 allows further processing of the requests in the particular IO trace sequence.

Figure 7:
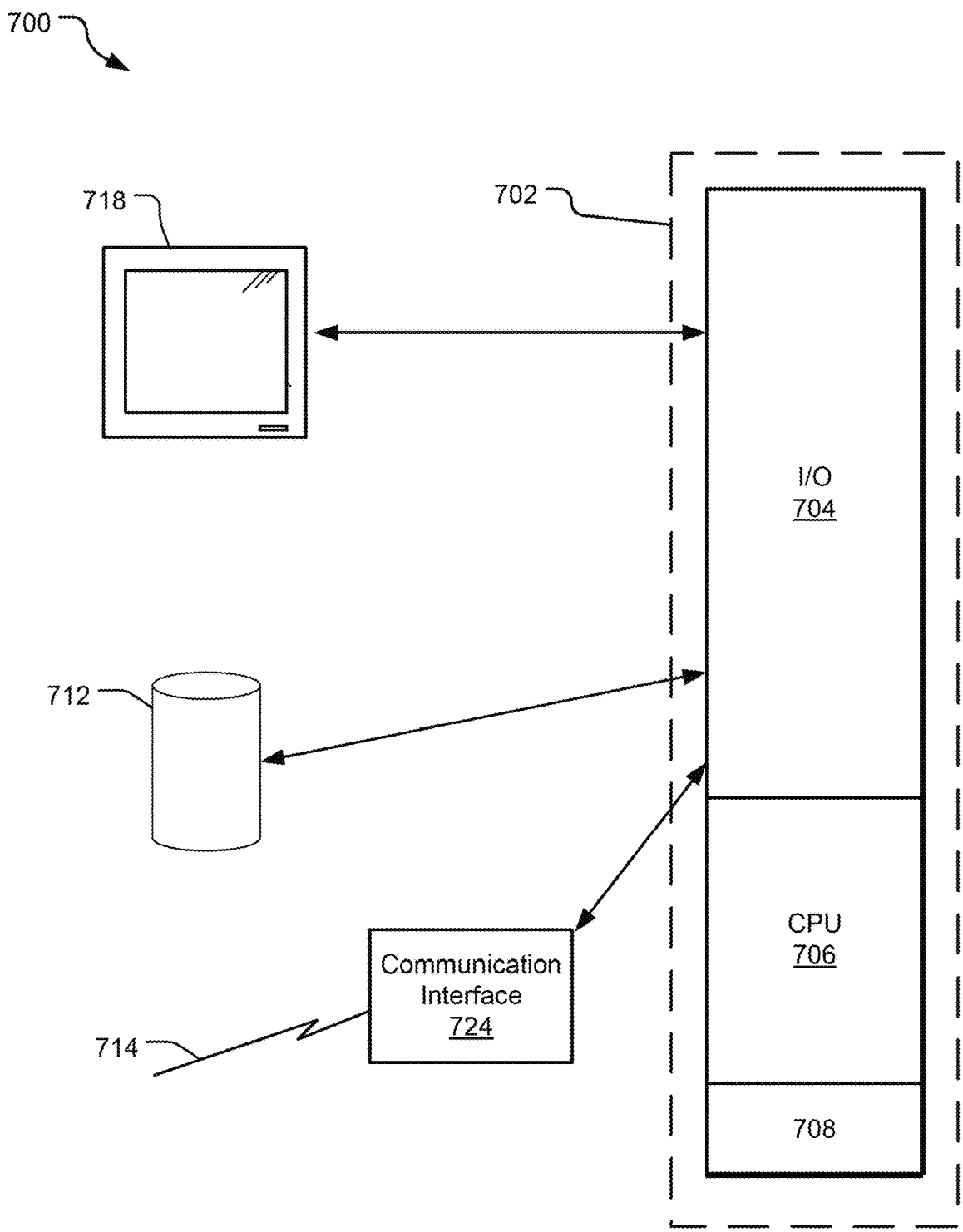
FIG. 7 illustrates an example processing system that may be useful in implementing the described technology.

FIG. 7 illustrates an example processing system 700 that may be useful in implementing the described technology. The processing system 700 is capable of executing a computer program product embodied in a tangible computer-readable storage medium to execute a computer process. Data and program files may be input to the processing system 700, which reads the files and executes the programs therein using one or more processors (central-processing units, graphics-processing units, or other processing-capable integrated circuits or emulators). Some of the elements of a processing system 700 are shown in FIG. 7, wherein a processor 702 is shown having an input/output (I/O) section (e.g., an I/O section 704), a central processing unit 706, and a memory section 708. There may be one or more instances of the processor 702 in the processing system 700, such that the processor 702 of the processing system 700 comprises a central processing unit 706, or a plurality of processing units (e.g., any one or multiples of a central processing unit, a graphics processing unit, a virtual machine, a container, an integrated circuit configured to process, and/or an application-specific integrated circuit). The processor 702 may be a single-core or multi-core processor. The processing system 700 may be a conventional computer, a distributed computer, or any other type of computer. The described technology is optionally implemented in software loaded in the memory section 708, a storage unit 712, and/or communicated via a wired or wireless network link 714 on a carrier signal (e.g., Ethernet, 3G wireless, 8G wireless, LTE (Long Term Evolution)) thereby transforming the processing system 700 in FIG. 7 to a special purpose machine for implementing the described operations. The processing system 700 may be an application-specific processing system configured for supporting a distributed ledger. In other words, the processing system 700 may be a ledger node.

The I/O section 704 may be connected to one or more user-interface devices (e.g., a keyboard, a touch-screen display unit 718, etc.) or a storage unit 712. Computer program products containing mechanisms to effectuate the systems and methods in accordance with the described technology may reside in the memory section 708 or on the storage unit 712 of such a processing system 700.

A communication interface 724 is capable of connecting the processing system 700 to an enterprise network via the wired or wireless network link 714, through which the computer system can receive instructions and data embodied in a carrier wave. When used in a local area networking (LAN) environment, the processing system 700 is connected (by wired connection or wirelessly) to a local network through the communication interface 724, which is one type of communication device. When used in a wide-area networking (WAN) environment, the processing system 700 typically includes a modem, a network adapter, or any other type of communications device for establishing communications over the wide-area network. In a networked environment, program modules depicted relative to the processing system 700 or portions thereof may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in the memory section 708 and/or the storage unit 712 and executed by the processor 702. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special-purpose computing system and specialized software (such as a mobile device or network appliance executing service software), or other computing configurations. In addition, keys, device information, identification, configurations, or other data may be stored in the memory section 708 and/or the storage unit 712 and executed by the processor 702.

The processing system 700 may be implemented in a device, such as a user device, a storage device, an IoT device, a desktop, a laptop, or another computing device. The processing system 700 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented by processor-executable instructions in firmware, software, hard-wired circuitry, gate array technology, or other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions, either permanently or temporarily, reside in the memory, along with other information, such as data, virtual mappings, operating systems, applications, and the like, that are accessed by a computer processor to perform the desired functionality. The term "memory" expressly does not include a transitory medium such as a carrier signal, but the computer instructions can be transferred to the memory wirelessly.

In contrast to tangible computer-readable storage media, which exclude signals per se, intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal.

In this specification, examples of machine learning or inferential models can include, without limitation, one or more of data mining algorithms, artificial intelligence algorithms, masked learning models, natural language processing models, neural networks, artificial neural networks, perceptrons, feed-forward networks, radial basis neural networks, deep feed forward neural networks, recurrent neural networks, long/short term memory networks, gated recurrent neural networks, auto encoders, variational auto encoders, denoising auto encoders, sparse auto encoders, Bayesian networks, regression models, decision trees, Markov chains, Hopfield networks, Boltzmann machines, restricted Boltzmann machines, deep belief networks, deep convolutional networks, genetic algorithms, deconvolutional neural networks, deep convolutional inverse graphics networks, generative adversarial networks, liquid state machines, extreme learning machines, echo state networks, deep residual networks, Kohonen networks, support vector machines, federated learning models, and/or neural Turing machines (e.g., in addition to any examples of inferential models explicitly disclosed elsewhere in the specification). In this specification, examples of training methods (e.g., inferential and/or machine learning model training methods) can include, without limitation, one or more of masked learning modeling, unsupervised learning, supervised learning, reinforcement learning, self-learning, feature learning, sparse dictionary learning, anomaly detection, robot learning, association rule learning, manifold learning, dimensionality reduction, bidirectional transformation, unidirectional transformation, gradient descent, autoregression, autoencoding, permutation language modeling, two-stream self-attenuation, federated learning, absorbing transformer-XL, natural language processing (NLP), bidirectional encoder representations from transformers (BERT) models and variants (e.g., ROBERTa, XLM-ROBERTa, and DistilBERT, ALBERT, CamemBERT, ConvBERT, DeBERTA, DeBERTA-v2, FlauBERT, I-BERT, herBERT, BertGeneration, BertJapanese, Bertweet, MegatronBERT, PhoBERT, MobileBERT, SqueezeBERT, BART, MBART, MBART-50BARThez, BORT, or BERT4REC), Allegro, cross-lingual language model (XLM) and variants (e.g., XLNet, XLM-ProphetNet, XLSR-Wav2Vec2, and Transformer XL), Auto Classes, BigBird, BigBirdPegasus, Blenderbot, Blenderbot Small, CLIP, CPM, CTRL, DeiT, DialoGPT, DPR, ELECTRA, Encoder Decoder Models, FSMT, Funnel Transformer, LayoutLM, LED, Longformer, LUKE, LXMERT, MarianMT, M2M100, MegatronGPT2, MPNet, MT5, OpenAI GPT, OpenAI GPT2, GPT Neo, Pegasus, ProphetNet, RAG, Reformer, Speech2Text, T5, TAPAS, Vision Transformer (ViT), OpenAI, GPT3, and/or Wav2Vec2 (e.g., in addition to any examples of inferential model training methods explicitly disclosed elsewhere in the specification).

The embodiments of the invention described herein are implemented as logical steps in one or more computer systems. The logical operations of the present invention are implemented (1) as a sequence of processor-implemented steps executing in one or more computer systems and/or (2) as interconnected machine or circuit modules within one or more computer systems. The implementation is a matter of choice and/or may depend on the performance requirements of the computer system implementing the invention. Accordingly, the logical operations making up the embodiments of the invention described herein may be referred to variously as operations, steps, objects, or modules. Furthermore, it should be understood that logical operations may be performed in any order unless explicitly claimed otherwise or a specific order is inherently necessitated by the claim language.

An implementation of the system disclosed herein provides a method including receiving a plurality of input/output (IO) requests at an object store, generating IO trace sequences by combining a predetermined number of the plurality of IO requests, generating batchwise metrics based on values of parameters within IO trace sequences corresponding to the batchwise metrics, each of the batchwise metrics corresponding to one of the IO trace sequences, generating inferential model input feature vectors based on the generated batchwise metrics, each of the generated inferential model input feature vectors corresponding to one of the IO trace sequences, and training an inferential model based on a plurality of the inferential model input feature vectors and ground truth values corresponding to the IO trace sequences, each of the ground truth values indicating whether a corresponding one of the IO trace sequences represents a ransomware attack.

In one implementation, generating the batchwise metrics further including generating the batchwise metrics including a batch of data per request, the batch of data representing an amount of data upon which requests represented in one of the IO trace sequences are configured to operate. In another implementation, generating the batchwise metrics further includes generating at least one of a batch read data size representing a size of data upon which read requests in one of the IO trace sequences are configured to operate and a batch write data size representing a size of data upon which write requests in one of the IO trace sequences are configured to operate.

In another implementation, generating the batchwise metrics further includes generating at least one of a batch read count representing a number of the predetermined number of the plurality of requests in one of the IO trace sequences that are read requests and a batch read count representing a number of the predetermined number of the plurality of requests in the one of the IO trace sequences that are write requests. Alternatively, generating the batchwise metrics further comprising generating a batch read/write comparison metric representing a comparison between read requests in a corresponding one of the IO trace sequences and write requests in the corresponding one of the IO trace sequences.

In another implementation, generating the batch read/write comparison metric further includes generating at least one of a read/write request ratio representing a ratio of data on which requests in one of the IO trace sequences including write operations are configured to operate data on which requests in the one of the IO trace sequences including read operations are configured to operate, and a read/write parity metric representing whether the read/write operation ratio is within a predefined threshold difference from a value of one. Alternatively, generating the batchwise metrics further includes generating a batch location metric representing a localization in memory of data upon which requests in one of the IO trace sequences are configured to operate. Yet alternatively, generating batchwise metrics based on values of parameters within IO trace sequences further includes determining an average or a median of the values of parameters within IO trace sequences.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
    receiving a plurality of input/output (IO) requests at an object store;
    generating IO trace sequences by combining a predetermined number of the plurality of IO requests;
    generating batchwise metrics based on values of parameters within IO trace sequences corresponding to the batchwise metrics, each of the batchwise metrics corresponding to one of the IO trace sequences;
    generating inferential model input feature vectors based on the generated batchwise metrics, each of the generated inferential model input feature vectors corresponding to one of the IO trace sequences; and
    training an inferential model based on a plurality of the inferential model input feature vectors and ground truth values corresponding to the IO trace sequences, each of the ground truth values indicating whether a corresponding one of the IO trace sequences represents a ransomware attack.

2. The method of claim 1, wherein generating the batchwise metrics further comprising generating the batchwise metrics including a batch of data per request, the batch of data representing an amount of data upon which requests represented in one of the IO trace sequences are configured to operate.

3. The method of claim 1, wherein generating the batchwise metrics further comprising generating at least one of:
    a batch read data size representing a size of data upon which read requests in one of the IO trace sequences are configured to operate; and
    a batch write data size representing a size of data upon which write requests in one of the IO trace sequences are configured to operate.

4. The method of claim 1, wherein generating the batchwise metrics further comprising generating at least one of:
    a batch read count representing a number of the predetermined number of the plurality of requests in one of the IO trace sequences that are read requests; and
    a batch read count representing a number of the predetermined number of the plurality of requests in the one of the IO trace sequences that are write requests.

5. The method of claim 1, wherein generating the batchwise metrics further comprising generating a batch read/write comparison metric representing a comparison between read requests in a corresponding one of the IO trace sequences and write requests in the corresponding one of the IO trace sequences.

6. The method of claim 5, wherein generating the batch read/write comparison metric further comprising generating at least one of:
    a read/write request ratio representing a ratio of data on which requests in one of the IO trace sequences including write operations are configured to operate data on which requests in the one of the IO trace sequences including read operations are configured to operate, and
    a read/write parity metric representing whether the read/write operation ratio is within a predefined threshold difference from a value of one.

7. The method of claim 1, wherein generating the batchwise metrics further comprising generating a batch location metric representing a localization in memory of data upon which requests in one of the IO trace sequences are configured to operate.

8. The method of claim 7, wherein the localization in memory is based on sector identification metric values representing locations in memory of data upon which requests represented in the one of the IO trace sequences are configured to operate.

9. The method of claim 1, wherein generating batchwise metrics based on values of parameters within IO trace sequences further comprising determining an average or a median of the values of parameters within IO trace sequences.

10. The method of claim 1, wherein generating batchwise metrics based on values of parameters within IO trace sequences further comprising determining a variance or a standard deviation of the values of parameters within IO trace sequences.

11. In a computing environment, a method performed at least in part on at least one processor, the method comprising:
    receiving a plurality of input/output (IO) requests at an object store;
    generating IO trace sequences by combining a predetermined number of the plurality of IO requests;
    generating batchwise metrics based on values of parameters within IO trace sequences corresponding to the batchwise metrics, each of the batchwise metrics corresponding to one of the IO trace sequences;
    generating inferential model input feature vectors based on the generated batchwise metrics, each of the generated inferential model input feature vectors corresponding to one of the IO trace sequences; and
    training an inferential model based on a plurality of the inferential model input feature vectors and ground truth values corresponding to the IO trace sequences, each of the ground truth values indicating whether a corresponding one of the IO trace sequences represents a ransomware attack.

12. The method of claim 11, wherein generating the batchwise metrics further comprising generating the batchwise metrics including a batch of data per request, the batch of data representing an amount of data upon which requests represented in one of the IO trace sequences are configured to operate.

13. The method of claim 11, wherein generating the batchwise metrics further comprising generating a batch read/write comparison metric representing a comparison between read requests in a corresponding one of the IO trace sequences and write requests in the corresponding one of the IO trace sequences.

14. The method of claim 13, wherein generating the batch read/write comparison metric further comprising generating at least one of:
- a read/write request ratio representing a ratio of data on which requests in one of the IO trace sequences including write operations are configured to operate data on which requests in the one of the IO trace sequences including read operations are configured to operate, and
- a read/write parity metric representing whether the read/write operation ratio is within a predefined threshold difference from a value of one.

15. The method of claim 11, wherein generating the batchwise metrics further comprising generating a batch location metric representing a localization in memory of data upon which requests in one of the IO trace sequences are configured to operate and wherein the localization in memory is based on sector identification metric values representing locations in memory of data upon which requests represented in the one of the IO trace sequences are configured to operate.

16. One or more non-transitory computer-readable storage media encoding computer-executable instructions for executing on a computer system a computer process, the computer process comprising:
- receiving a plurality of input/output (IO) requests at an object store;
- generating IO trace sequences by combining a predetermined number of the plurality of IO requests;
- generating batchwise metrics based on values of parameters within IO trace sequences corresponding to the batchwise metrics, each of the batchwise metrics corresponding to one of the IO trace sequences;
- generating inferential model input feature vectors based on the generated batchwise metrics, each of the generated inferential model input feature vectors corresponding to one of the IO trace sequences; and
- training an inferential model based on a plurality of the inferential model input feature vectors and ground truth values corresponding to the IO trace sequences, each of the ground truth values indicating whether a corresponding one of the IO trace sequences represents a ransomware attack.

17. One or more tangible computer-readable storage media of claim 16, wherein generating the batchwise metrics further comprising generating the batchwise metrics including a batch of data per request, the batch of data representing an amount of data upon which requests represented in one of the IO trace sequences are configured to operate.

18. One or more tangible computer-readable storage media of claim 16, wherein generating the batchwise metrics further comprising generating a batch read data size representing a size of data upon which read requests in one of the IO trace sequences are configured to operate.

19. One or more tangible computer-readable storage media of claim 16, wherein generating the batchwise metrics further comprising generating a batch write data size representing a size of data upon which write requests in one of the IO trace sequences are configured to operate.

20. One or more tangible computer-readable storage media of claim 16, wherein generating the batchwise metrics further comprising generating a batch read count representing a number of the predetermined number of the plurality of requests in one of the IO trace sequences that are read requests.

* * * * *